United States Patent [19]

Jain

[11] Patent Number: 4,558,423
[45] Date of Patent: Dec. 10, 1985

[54] UTILIZATION OF AN ASTM END POINT TEMPERATURE FOR CONTROLLING A FRACTIONAL DISTILLATION PROCESS

[75] Inventor: Gyan P. Jain, Bartlesville, Okla.

[73] Assignee: Phillips Petroleum Company, Bartlesville, Okla.

[21] Appl. No.: 498,997

[22] Filed: May 27, 1983

[51] Int. Cl.[4] .......................................... G06F 15/46
[52] U.S. Cl. ............................... 364/501; 364/152; 364/500; 203/2; 203/DIG. 18; 202/160
[58] Field of Search ...................... 364/501, 500, 152; 203/87, 88, 2, DIG. 18; 202/160; 208/DIG. 1

[56] References Cited

U.S. PATENT DOCUMENTS

| | | | |
|---|---|---|---|
| 3,619,377 | 11/1971 | Palmer | 364/501 X |
| 3,907,388 | 9/1975 | Stanton et al. | 208/DIG. 1 X |
| 3,911,259 | 10/1975 | Huddleston et al. | 202/160 X |
| 3,996,785 | 12/1976 | Mead et al. | 73/17 A |
| 4,007,112 | 2/1977 | Beuker et al. | 208/DIG. 1 X |
| 4,295,196 | 10/1981 | Furr | 364/501 |
| 4,347,577 | 8/1982 | Ganster et al. | 364/501 |

OTHER PUBLICATIONS

An On-Stream Boiling Point Monitor Employing a Microcomputer; Bajek et al., Conference 8th Imeko Cong. 5/79.

*Primary Examiner*—Jerry Smith
*Assistant Examiner*—Louis Woo
*Attorney, Agent, or Firm*—French & Doescher

[57] ABSTRACT

In a fractional distillation process in which it is desired to maintain a desired ASTM end point temperature of the overhead liquid product withdrawn from the fractional distillation process, changes in the slope of the equilibrium flash vaporization boiling point line are utilized to determine the actual slope of the ASTM boiling point curve at any particular time. The actual ASTM end point temperature for the overhead liquid product is derived based on the actual slope of the ASTM boiling point curve thus determined. The actual ASTM end point temperature is utilized to control the fractional distillation process so as to maintain a desired ASTM end point temperature for the overhead liquid product withdrawn from the fractional distillation process.

11 Claims, 3 Drawing Figures

UTILIZATION OF AN ASTM END POINT TEMPERATURE FOR CONTROLLING A FRACTIONAL DISTILLATION PROCESS

This invention relates to control of a fractional distillation process. In one aspect, this invention relates to method and apparatus for maintaining a desired ASTM end point temperature for the overhead liquid product from a fractional distillation process.

As used herein, the term "end point temperature" refers to the temperature at which all of a liquid had boiled off. The term "initial point temperature" refers to a temperature at which a liquid first begins to boil. The American Society for Testing Materials (ASTM) describes particular procedures for determining an end point temperature and, as used herein, the ASTM end point temperature refers to an end point temperature determined by the procedures specified by ASTM.

Fractional distillation columns are employed in many processes to make desired separations. The separations may range from single component separations to the more complex multiple separations performed by crude distillation towers. Typically, a feed stream containing at least first and second components is supplied to the fractional distillation column. A substantial portion of the first component contained in the feed stream is removed from the fractional distillation column as an overhead product and a substantial portion of the second component in the feed stream is removed from the fractional distillation process as a bottoms product. Heat is generally supplied to the fractional distillation column in order to effect the desired separation. It is also noted that, in towers such as crude distillation towers where a more complex separation is being performed, side products may also be withdrawn from the fractional distillation column.

Various specifications are used for the product streams withdrawn from a fractional distillation column. For an overhead liquid product stream, the specification may be the desired percentage of some component in the overhead liquid product stream. Also, a desired ASTM end point may be specified for an overhead liquid product stream.

Many different methods have been proposed for controlling fractional distillation columns in such a manner that the overhead liquid product stream drawn from a fractional distillation column meets desired specifications. Where the desired specification is a ASTM end point, one method which has been utilized is the analysis of the overhead liquid product stream to determine the ASTM end point temperature of the overhead liquid product stream. Control of the fractional distillation column is then based on such an analysis. However, on many fractional distillation columns, such as an atmospheric crude tower, it may be very difficult to actually measure the ASTM end point temperature of the overhead liquid product stream.

Even if analysis of the overhead liquid product stream is possible, measurement delays result from such analysis, particularly if the analysis must be carried out in a laboratory, and continuous control of the fractional distillation column is lost. Also, it is very difficult to maintain analyzers for measuring ASTM end point temperatures.

In a book entitled Distillation by Matthew Van Winkle (1967 by McGraw-Hill and referred to hereinafter as "Van Winkle") a method for determining the ASTM end point temperature based on a knowledge of the slope of the ASTM boiling point curve (the form of which will be described more fully hereinafter) and the equilibrium flash vaporization (EFV) end point temperature is described. However, while the EFV end point temperature may be calculated based on process measurements such as pressures and temperatures, it has been found that the slope of the ASTM boiling point curve for the overhead liquid product from a fractional distillation column changes significantly and frequently over a period of time. Thus, without calculating the change in the slope of the ASTM boiling point curve, it is difficult to utilize the method described by Van Winkle to reliably calculate the ASTM end point of the overhead liquid product. However, because of the form of the ASTM boiling point curve, it is difficult to determine the changes in the slope of the ASTM boiling point curve.

It is thus an object of this invention to provide a method and apparatus for determining the change in the slope of the ASTM boiling point curve for the overhead liquid product from a fractional distillation column so as to provide a means for determining the actual ASTM end point temperature for the overhead liquid product from the fractional distillation column and thus provide a basis for maintaining a desired ASTM end point temperature for the overhead liquid product.

In accordance with the present invention, it has been found that changes in the slope of the EFV boiling point line (described more fully hereinafter) can be utilized to determine the actual slope of the ASTM boiling point curve at any particular time. A basis is thus provided for determining the actual ASTM end point temperature which may be utilized to control the fractional distillation process so as to maintain a desired ASTM end point temperature for the overhead liquid product from the fractional distillation process.

In general, the EFV boiling point line is used to calculate the actual slope of the ASTM boiling point curve at any particular time based on the finding that the slope of the ASTM boiling point curve will change in the same manner as the slope of the EFV boiling point line changes. Thus, the actual slope of the ASTM boiling point curve at a particular time $T_2$ can be determined by using a correction factor derived from the slope of the ASTM boiling point curve at an earlier time $T_1$ the slope of the EFV boiling point line at the time $T_1$ and the actual slope of the EFV boiling point line at the time $T_2$.

Figure 1:
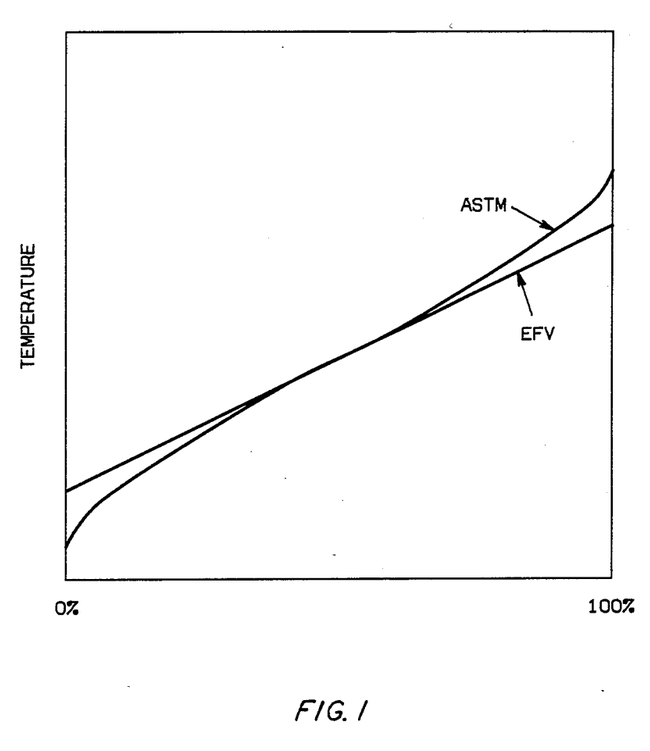
FIG. 1 is a simplified illustration of an ASTM boiling point curve and an EFV boiling point line.

FIG. 1 illustrates the basic form of the ASTM boiling point curve and the EFV boiling point line. FIG. 1 is intended to show only the basic form and is not intended to be representative of any actual ASTM curve or EFV line. As can be seen from FIG. 1, in contrast to the ASTM curve, the EFV line is a substantially straight line. Thus, it is possible to calculate the slope of EFV line by calculating the EFV end point temperature and the EFV initial point temperature. Again, the shape of the ASTM curve makes it difficult to calculate changes in the ASTM curve at a point such as the end point temperature.

Other objects and advantages of the invention will be apparent from the foregoing brief description of the invention and the claims as well as the detailed description of the drawings which are briefly described as follows:

The invention is illustrated and described in terms of a crude tower for fractionating a crude oil feed. However, the invention is applicable to any fractional distillation process in which it is desired to control the ASTM end point temperature of the overhead liquid product withdrawn from the fractional distillation process.

Figure 2:
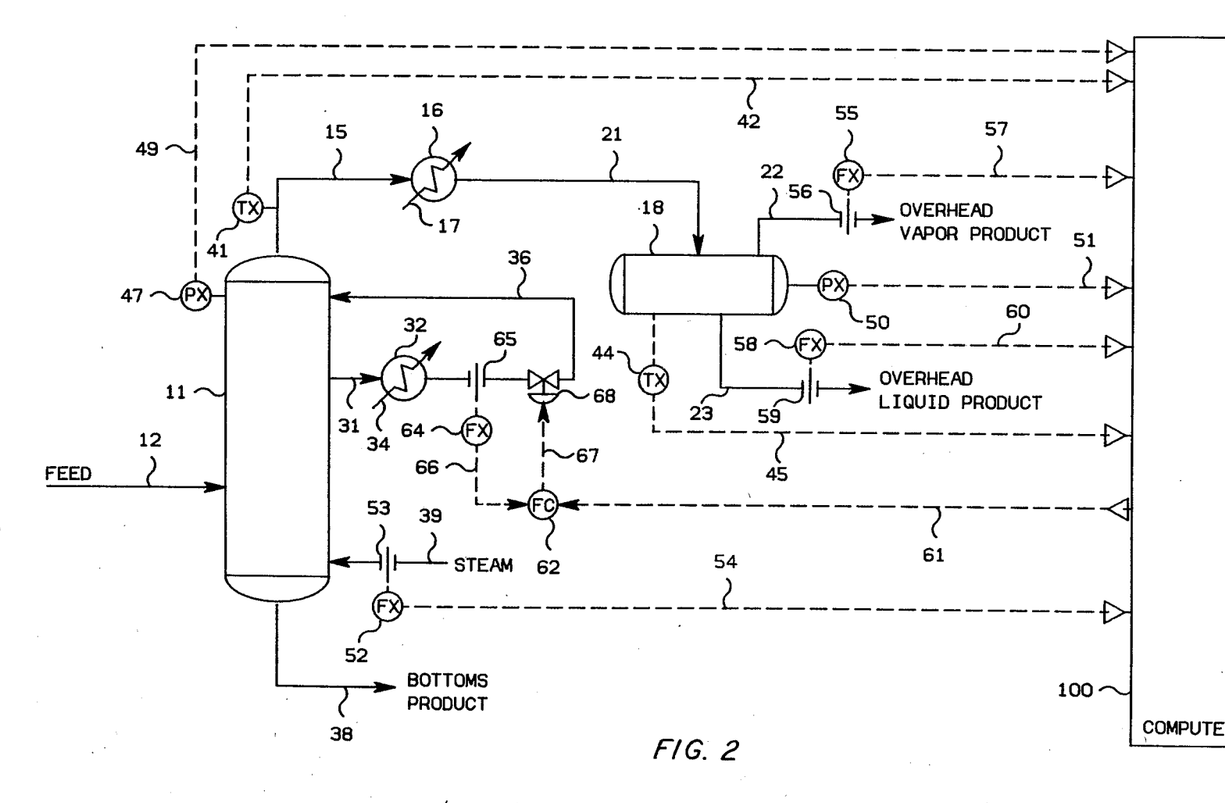
FIG. 2 is an illustration of a fractional distillation column and the associated control system for maintaining a desired ASTM end point temperature.

A specific control system configuration is set forth in FIG. 2 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in the control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combination of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 2, there is illustrated a fractional distillation column 11 which is utilized to fractionate a crude oil feed into a variety of products. For the sake of simplicity, only the overhead product and bottoms product are illustrated in FIG. 2. The crude oil feed is supplied to the fractional distillation column 11 through conduit means 12. The crude oil feed will have generally been preheated prior to entering the fractional distillation column 11.

An overhead stream is provided from the fractional distillation column 11 through conduit means 15 to the heat exchanger 16. The heat exchanger 16 is provided with a cooling medium flowing through conduit means 17. A fluid stream from the heat exchanger 16 is provided to the overhead accumulator 18 through conduit means 21. Vapor in the overhead accumulator 18 is withdrawn from the overhead accumulator through conduit means 22 and is generally referred to as the overhead vapor product. Liquid in the overhead accumulator 18 is withdrawn from the overhead accumulator through conduit means 23 and is generally referred to as the overhead liquid product.

On many fractional distillation columns, a portion of the overhead liquid product withdrawn through conduit means 23 would be returned to the fractional distillation column as an upper external reflux. However, on the crude tower to which the present invention was applied, a fluid stream withdrawn from a lower portion of the fractional distillation column 11 through conduit means 31 was utilized as the upper external reflux. In either case, the purpose is the same and in both cases the fluid streams would be referred to as the upper external reflux.

The fluid stream flowing through conduit means 31 is provided to the heat exchanger 32. The heat exchanger 32 is also provided with a cooling medium flowing through conduit means 34. The fluid stream from the heat exchanger 32 is provided to the top of the fractional distillation column 11 through conduit means 36.

A bottoms stream generally containing reduced crude oil is withdrawn from the fractional distillation column 11 through conduit means 38. Steam is provided to the fractional distillation column 11 through conduit means 39. It is noted that, in many cases, heat would be provided to the fractional distillation column by a fired reboiler or by circulating steam through conduits in the fractional distillation column. However, again, on the particular crude tower to which the present invention was actually applied, preheating of the feed stream was used to supply heat to the fractional distillation column and steam was used as a stripping fluid.

The overhead liquid product is generally referred to as the naphtha product. A number of other side draw products such as kerosene, light cycle oil and heavy cycle oil would generally be withdrawn from a crude tower. However, for the sake of simplicity, these remaining process streams have not been illustrated since they play no part in the invention. Also, the many pumps, additional heat exchangers, additional control components and other typical fractional distillation equipment have not been illustrated.

The manner in which various process variables are measured and the results of the measurements provided to a computer is as follows:

Temperature transducer 41 in combination with a temperature measuring device such as a thermocouple, which is operably located in conduit means 15, provides an output signal 42 which is representative of the temperature of the overhead stream flowing through conduit means 15. Signal 42 is provided from the temperature transducer 41 as an input to computer 100. It is again noted that transducing of signal 42 would be required but such transducing has not been illustrated for the sake of simplicity.

In like manner, temperature transducer 44 in combination with a temperature measuring device such as a thermocouple, which is operably located in the overhead accumulator 18, provides an output signal 45 which is representative of the actual temperature of the fluid in the overhead accumulator 18. Signal 45 is provided from temperature transducer 44 as an input to computer 100.

Pressure transducer 47 in combination with a pressure sensing device, which is operably located in the upper portion of the fractional distillation column 11, provides an output signal 49 which is representative of the actual pressure in the upper portion of the fractional distillation column 11. Signal 49 is provided from the pressure transducer 47 as an input to computer 100.

In like manner, pressure transducer 50 in combination with a pressure sensing device, which is operably located in the overhead accumulator 18, provides an output signal 51 which is representative of the actual pressure in the overhead accumulator 18. Signal 51 is provided from the pressure transducer 50 as an input to computer 100.

Flow transducer 52 in combination with the flow sensor 53, which is operably located in conduit means 39, provides an output signal 54 which is representative of the actual flow rate of steam through conduit means 39. Signal 54 is provided from the flow transducer 52 as an input to computer 100.

In like manner, flow transducer 55 in combination with flow sensor 56, which is operably located in conduit means 22, provides an output signal 57 which is representative of the actual flow rate of the overhead vapor product through conduit means 22. Flow transducer 58 in combination with flow sensor 59, which is operably located in conduit means 23, provides an output signal 60 which is representative of the actual flow rate of the overhead liquid product through conduit means 23. Both signals 57 and 60 are provided as inputs to computer 100.

In response to the described process variables, computer 100 calculates the flow rate of the upper external reflux required to maintain the actual ASTM end point temperature of the overhead liquid product flowing through conduit means 23 substantially equal to a desired ASTM end point temperature. Signal 61, which is representative of this desired flow rate, is provided from computer 100 as the set point input to the flow controller 62.

Flow transducer 64 in combination with the flow sensor 65, which is operably located in conduit means 36, provides an output signal 66 which is representative of the actual flow rate of the upper external reflux through conduit means 36. Signal 66 is provided from the flow transducer 64 as the process variable input from the flow controller 62.

In response to signals 61 and 66, the flow controller 62 provides an output signal 67 which is scaled so as to be representative of the position of the control valve 68, which is operably located in conduit means 36, required to maintain the actual flow rate of the upper external reflux through conduit means 36 substantially equal to the desired flow rate represented by signal 61. Signal 67 is provided from the flow controller 62 as the control signal for the control valve 68 and the control valve 68 is manipulated in response thereto.

Figure 3:
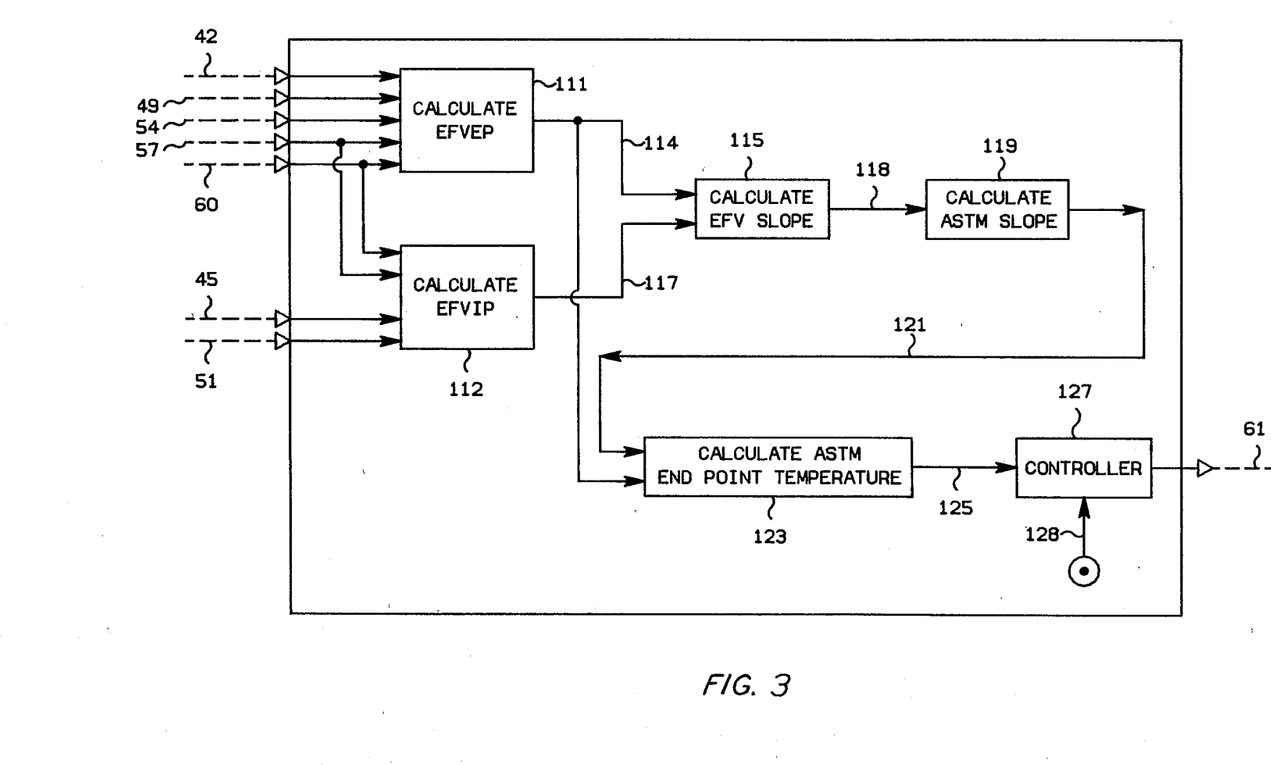
FIG. 3 is a logic diagram for the computer logic utilized to generate the control signal utilized in the control of the ASTM end point temperature for the overhead liquid product stream withdrawn from the fractional distillation column illustrated in FIG. 2.

The logic utilized to calculate the magnitude of the set point signal 61 based on the process variables measured is illustrated in FIG. 3. Referring now to FIG. 3, signal 42, which is representative of the temperature of the overhead vapor stream flowing through conduit means 15, is provided as an input to the calculate equilibrium flash vaporization end point (EFVEP) block 111. In like manner, signal 49, which is representative of the actual pressure in the upper portion of the fractional distillation column 11, and signal 54, which is representative of the actual flow rate of steam through conduit means 39, are provided as inputs to the calculate EFVEP block 111.

Signal 57, which is representative of the actual flow rate of the overhead vapor product, is provided as an input to the calculate EFVEP block 111 and is also as an input to the calculate the equilibrium flash vaporization initial point temperature (EFVIP) block 112. In like manner, signal 60, which is representative of the actual flow rate of the overhead liquid product is provided as an input to both the calculate EFVEP block 111 and the calculate EFVIP block 112.

The EFVEP for the overhead liquid product is calculated in response to the described process variables as follows:

The hydrocarbon partial pressure (HPP) is given by equation (1):

$$HPP = \frac{(\text{Moles } H) \times (P_1)}{\text{Moles } H + \text{Moles } I} \qquad (1)$$

where

Moles H = the moles of hydrocarbon contained in the overhead liquid product;

$P_1$ = the total pressure in the upper portion of the fractional distillation column 11 (signal 49); and Moles I = the moles of inert contained in the overhead liquid product.

Moles H is given by equation (2):

$$\text{Moles } H = \frac{F_1}{\text{Molecular weight of hydrocarbons in Overhead Liquid Product}} \qquad (2)$$

where $F_1$ = the flow rate of the overhead liquid product stream (signal 60).

The molecular weight of the hydrocarbons contained in the overhead liquid product may be calculated by any conventional technique. The molecular weight of the hydrocarbons is preferably calculated as a function of the mean average boiling point and gravity of hydrocarbons using the NGPSA Engineering Data Book published by the Natural Gas Processors Suppliers Association, 9th Edition, pages 16-25, 1972. Initial estimates of the mean average boiling point and gravity are obtained from laboratory analysis of typical products. The mean average boiling point and gravity can be periodically updated from laboratory data. The mean average boiling point will typically be in the range of from about 200° to about 280° F. The gravity will typically be in the range of about 55° to about 75° API.

Moles I is given by equation (3):

$$\text{Moles } I = \frac{F_2}{\text{Molecular weight of Overhead Vapor Product}} + \frac{F_3}{\text{Molecular weight of Steam}}$$

where $F_2$ = the flow rate of the overhead vapor product (signal 57); and $F_3$ = the flow rate of the steam through conduit means 39 (signal 54).

The molecular weight of steam will be known. The molecular weight of the overhead product stream is calculated from laboratory data using analysis of typical samples. The molecular weight can be periodically updated using laboratory data. The molecular weight of the overhead vapor stream will typically be in the range of about 30 to about 40 pounds per mole.

The EFVEP is equal to the boiling point of normal paraffin hydrocarbons at 760 millimeters of mercury absolute pressure. The EFVEP is calculated from FIGS. 5-27; page 208, of a book entitled Petroleum Refinery Engineering by W. L. Nelson (1958, McGraw-Hill Book Company and referred to hereinafter as "Nelson"). When using FIGS. 5-27, the vapor pressure of FIGS. 5-27 is equal to the hydrocarbon partial pressure calculated in accordance with equation (1).

The temperature required for use of FIGS. 5-27 to calculate the EFVEP is the temperature of the overhead vapor stream flowing through conduit means 15 (signal 42). Using the hydrocarbon partial pressure determined in accordance with equation (1) and the measured temperature of the overhead vapor stream flowing through conduit means 15, the EFVEP may be determined directly from FIGS. 5-27 of Nelson.

FIGS. 5-27 is entered into the computer by entering sets of related numbers for the partial pressure, temperature and boiling point. A regression analysis is then used to interpolate between the entered points to achieve the desired accuracy.

If a steam stripping stream (or other similar stream) is not provided to the fractional distillation process, the steam term in Equation (3) will not be used. In like manner, if total condensing is used such that an overhead vapor stream is not withdrawn from the overhead accumulator, the overhead vapor term in equation (3) will not be used.

In addition to the previously described process variables which are provided to the calculate EFVIP block 112, signal 45, which is representative of the actual temperature of the fluid in the overhead accumulator 18, is provided as an input to the EFVIP block 112. Also, signal 51, which is representative of the actual pressure in the overhead accumulator 18, is provided as an input to the calculate EFVIP block 112.

The EFVIP is calculated in exactly the same manner as previously described for the EFVEP except that the pressure used is the pressure in the overhead accumulator (signal 51) as opposed to the pressure in the upper portion of the fractional distillation column and the temperature used is the temperature of the fluid in the overhead accumulator (signal 45) as opposed to the temperature of the overhead vapor stream flowing through conduit means 15. Also, the steam flow term of Equation 3 is not used to calculate the EFVIP because all of the steam is condensed. Again, the EFVIP may be derived directly from FIGS. 5-27 of Nelson based on the hydrocarbon partial pressure determined (in accordance with equation (1) and the measured temperature of the fluids in the overhead accumulator 18.

Signal 114, which is representative of the actual EFVEP of the overhead liquid product is provided from the calculate EFVEP block 111 as an input to the calculate EFV slope block 115. In like manner, signal 117, which is representative of the actual EFVIP of the overhead liquid product, is provided from the calculate EFVIP block 112 as an input to the calculate EFV slope block 115.

The slope of the EFV line formed by drawing a straight line between the EFVEP and EFVIP, as illustrated in FIG. 1, is given by equation (4):

$$\text{Slope} = \frac{EFVEP - EFVIP}{100} \qquad (4)$$

The slope calculated in accordance with equation (4), which is represented by signal 118, is provided from the calculate EFV slope block 115 as an input to the calculate ASTM slope block 119.

As initial estimate of the slope of the ASTM boiling point curve, such as the curve illustrated in FIG. 1, at a particular point such as the 100 percent end point, is obtained from laboratory analysis of typical samples. The slope of the ASTM curve will generally be in the range of about 2° F./% to about 4° F./%. Typical values of the slope of the EFV line are in the range of about 1° F./% to about 3° F./%. Initial estimates of the ASTM slope and the EFV slope are utilized to initiate the calculations but are not utilized thereafter.

The slope of the ASTM curve at a time $T_2$ (ASTM Slope $(T_2)$) at a particular point such as the end point is given by equation (5):

$$\text{ASTM Slope } (T_2) = \text{ASTM Slope } (T_1) \times \frac{\text{EFV Slope } (T_2)}{\text{EFV Slope } (T_1)} \quad (5)$$

where

ASTM Slope $(T_1)$ = the slope of the ASTM curve at a time $T_1$ which is earlier in time than the time $T_2$;

EFV Slope $(T_2)$ = the slope of the EFV line at time $T_2$; and

EFV Slope $(T_1)$ = the slope of the EFV line at time $T_1$.

In practice, a new ASTM slope is calculated periodically. The period will be the difference between times $T_1$ and $T_2$. Essentially, the last calculated value for the ASTM slope (ASTM Slope $(T_1)$) is updated based the new calculated value for the EFV slope (EFV Slope $(T_2)$). This procedure continues on a periodic basis. Thus an updated ASTM slope is available for use in calculating the ASTM end point temperature as will be described more fully hereinafter.

Signal 121, which is representative of ASTM Slope $(T_2)$ is provided from the calculate ASTM slope block 119 as an input to the calculate ASTM end point temperature block 123.

The ASTM Slope $(T_2)$ is utilized to derive a correction factor for the EFV end point temperature which is represented by signal 114. This is accomplished by using FIG. 3.27 at page 147 of Van Winkle. Based on the ASTM Slope $(T_2)$ and the end point, the correction factor can be derived directly from FIG. 3.27. This correction factor is added to signal 114 to derive what will be referred to as a corrected EFV end point temperature.

This corrected EFV end point temperature may be utilized to derive the ASTM end point temperature directly using FIG. 3.26 at page 146 of Van Winkle which illustrates the relationship between the ASTM temperature and the EFV uncorrected temperature.

FIGS. 3-27 of Van Winkle is entered into the computer by entering related numbers of the ASTM Slope and the Correction to EFV Temperature. FIGS. 3-26 of Van Winkle is entered into the computer by entering related numbers for ASTM Temperature and EFV Temperature. Again, a regression analysis is used to interpolate for the desired accuracy.

Signal 125, which is representative of the actual ASTM end point temperature of the overhead liquid product is provided from the calculate ASTM end point temperature block 123 as the process variable input to the controller block 127.

The controller block 127 is also provided with a set point signal 128 which is representative of the desired ASTM end point temperature for the overhead liquid product. In response to signals 125 and 128 the controller block 127 provides an output signal 61 which is scaled so as to be representative of the flow rate of the upper external reflux flowing through conduit means 36 required to maintain the actual ASTM end point temperature of the overhead liquid product substantially equal to the desired end point temperature represented by signal 128. Signal 61 is provided as an output from computer 100 and is utilized as is previously described.

It is noted that, while signal 61 is preferably scaled so as to be representative of the flow rate of the upper external reflux, signal 61 could be scaled so as to be representative of the position of the control valve 68 required to maintain the desired ASTM end point temperature for the overhead liquid product. If this were done, there would be no need for the level of control represented by the flow controller 62 and the flow transducer 64, illustrated in FIG. 2. However, some accuracy may be lost in directly manipulating the control valve 68 in reponse to signal 61 and it is thus preferred to utilize the level of control as described above.

In summary, based on the measurement of process variables associated with a fractional distillation process, changes in the slope of the EFV boiling point line may be calculated. These changes may be utilized to update the slope of the ASTM boiling point curve periodically. The slope of the ASTM boiling point curve is utilized to determine the actual, current ASTM end point temperature of the overhead liquid product and this actual determination is utilized to control the fractional distillation process so as to maintain the actual ASTM end point temperature substantially equal to a desired ASTM end point temperature as set by product specifications for the overhead liquid product.

The invention has been described in terms of a preferred embodiment as illustrated in FIGS. 1-3. Specific components used in the practice of the invention as illustrated in FIG. 2 such as flow sensors 53, 56, 59 and 65; flow transducers 52, 55, 58 and 64; temperature transducers 41 and 44; pressure transducers 47 and 50 and control valve 68 are each well-known, commercially available control components such as are described in length in Perry's Chemical Engineers Handbook, 4th Ed., Chapter 22, McGraw-Hill.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:
a fractional distillation column means;
means for providing a feed stream to said fractional distillation column means;
a cooling means;
an overhead accumulator means;
means for withdrawing an overhead vapor stream from an upper portion of said fractional distillation column means and for passing said overhead vapor stream through said cooling means to said overhead accumulator means;
means for withdrawing a liquid stream from said overhead accumulator means as an overhead liquid product;

means for providing an upper external reflux to said fractional distillation column means;

means for establishing a first signal representative of the slope of the equilibrium flash vaporization boiling point line for said overhead liquid product at a time $T_2$;

means for establishing a second signal representative of the actual slope of the ASTM boiling point curve for said overhead liquid product at said time $T_2$ in response to said first signal;

means for establishing a third signal representative of the actual ASTM end point temperature for said overhead liquid product in response to said second signal;

means for establishing a fourth signal representative of a desired ASTM end point temperature for said overhead liquid product;

means for comparing said third signal and said fourth signal and for establishing a fifth signal which is responsive to the difference between said third signal and said fourth signal; and means for manipulating the flow rate of said upper external reflux to said fractional distillation column means in response to said fifth signal.

2. Apparatus in accordance with claim 1 wherein said means for establishing said first signal comprises:

means for establishing a sixth signal representative of the actual pressure in an upper portion of said fractional distillation column means at said time $T_2$;

means for establishing a seventh signal representative of the actual temperature of said overhead vapor stream at said time $T_2$;

means for establishing an eighth signal representative of the actual flow rate of said overhead liquid product at said time $T_2$;

means for establishing a ninth signal representative of the equilibrium flash vaporization end point temperature (EFVEP) at said time $T_2$ for said overhead liquid product in response to said sixth, seventh and eighth signals;

means for establishing a tenth signal representative of the actual pressure in said overhead accumulator at said time $T_2$;

means for establishing an eleventh signal representative of the actual temperature in said overhead accumulator at said time $T_2$;

means for establishing a twelfth signal representative of the equilibrium flash vaporization initial point temperature (EFVIP) at said time $T_2$ in response to said eighth, tenth and eleventh signals; and means for subtracting said twelfth signal from said ninth signal and dividing the result by 100 to establish said first signal.

3. Apparatus in accordance with claim 1 additionally comprising:

means for providing steam to said fractional distillation column means; and means for withdrawing an overhead vapor product from said overhead accumulator.

4. Apparatus in accordance with claim 3 wherein said means for establishing said first signal comprises:

means for establishing a sixth signal representative of the actual pressure in an upper portion of said fractional distillation column means at said time $T_2$;

means for establishing a seventh signal representative of the actual temperature of said overhead vapor stream at said time $T_2$;

means for establishing an eighth signal representative of the actual flow rate of said overhead liquid product at said time $T_2$;

means for establishing a ninth signal representative of the actual flow rate of said steam at said time $T_2$;

means for establishing a tenth signal representative of the actual flow rate of said overhead vapor product at said time $T_2$;

means for establishing an eleventh signal representative of the equilibrium flash vaporization end point temperature (EFVEP) at said time $T_2$ in response to said sixth, seventh, eighth, ninth, and tenth signals;

means for establishing the twelfth signal representative of the actual pressure in said overhead accumulator at said time $T_2$;

means for establishing a thirteenth signal representative of the actual temperature in said overhead accumulator at said time $T_2$;

means for establishing a fourteenth signal representative of the equilibrium flash vaporization initial point temperature (EFVIP) at said time $T_2$ for said overhead liquid product in response to said eighth, ninth, tenth, twelth and thirteenth signals; and means for subtracting said fourteenth signal from said eleventh signal and dividing the result by 100 to establish said first signal.

5. Apparatus in accordance with claim 1 wherein said means for establishing said second signal comprises means for multiplying the actual slope of the ASTM boiling point curve for said overhead liquid product at a time $T_1$, which is earlier in time than said time $T_2$, by a factor derived by dividing said first signal by the slope of the equilibrium flash vaporization boiling point line for said overhead liquid product at said time $T_1$.

6. Apparatus in accordance with claim 1 wherein said fifth signal is scaled so as to be representative of the flow rate of said upper external reflux required to maintain the actual ASTM end point temperature for said overhead liquid product substantially equal to the desired ASTM end point temperature and wherein said means for manipulating the flow rate of said upper external reflux in response to said fifth signal comprises:

a control valve operably located so as to control the flow of said upper external reflux;

means for establishing a sixth signal representative of the actual flow rate of said upper external reflux;

means for comparing said fifth signal and said sixth signal and for establishing a seventh signal which is responsive to the difference between said fifth signal and said sixth signal, wherein said seventh signal is scaled so as to be representative of the position of said control valve required to maintain the actual flow rate of said upper external reflux substantially equal to the desired flow rate represented by said fifth signal; and means for manipulating said control valve in response to said seventh signal.

7. A method for maintaining a desired ASTM end point temperature for an overhead liquid product withdrawn from an overhead accumulator associated with a fractional distillation column, wherein a feed stream is provided to said fractional distillation column, wherein an overhead vapor stream is withdrawn from an upper portion of said fractional distillation column, cooled, and then provided to said overhead accumulator and wherein an upper external reflux is provided to an upper portion of said fractional distillation column, said method comprising the steps of:

establishing a first signal representative of the slope of the equilibrium flash vaporization boiling point line for said overhead liquid product at a time $T_2$;

establishing a second signal representative of the actual slope of the ASTM boiling point curve for said overhead liquid product at said time $T_2$ in response to said first signal;

establishing a third signal representative of the actual ASTM end point temperature for said overhead liquid product in response to said second signal;

establishing a fourth signal representative of the desired ASTM end point temperature for said overhead liquid product;

comparing said third signal and said fourth signal and establishing a fifth signal which is responsive to the difference between said third signal and said fourth signal; and manipulating the flow rate of said upper external reflux to said fractional distillation column in response to said fifth signal.

8. A method in accordance with claim 7 wherein said step of establishing said first signal comprises:

establishing a sixth signal representative of the actual pressure in an upper portion of said fractional distillation column at said time $T_2$;

establishing a seventh signal representative of the actual temperature of said overhead vapor stream at said time $T_2$;

establishing an eighth signal representative of the actual flow rate of said overhead liquid product at said time $T_2$;

establishing the equilibrium flash vaporization end point temperature (EFVEP) at said time $T_2$ for said overhead liquid product in response to said sixth, seventh and eighth signals;

establishing a tenth signal representative of the actual pressure in said overhead accumulator at said time $T_2$;

establishing an eleventh signal representative of the actual temperature in said overhead accumulator at said time $T_2$;

establishing a twelfth signal representative of the equilibrium flash vaporization initial point temperature (EFVIP) at said time $T_2$ in response to said eighth, tenth and eleventh signals; and subtracting said twelfth signal from said ninth signal and dividing the result by 100 to establish said first signal.

9. A method in accordance with claim 7 wherein steam is provided to said fractional distillation column, wherein an overhead vapor product is withdrawn from said overhead accumulator and wherein said step of establishing said first signal comprises:

establishing a sixth signal representative of the actual pressure in an upper portion of said fractional distillation column at said time $T_2$;

establishing a seventh signal representative of the actual temperature of said overhead vapor stream at said time $T_2$;

establishing an eighth signal representative of the actual flow rate of said overhead liquid product at said time $T_2$;

establishing a ninth signal representative of the actual flow rate of said steam at said time $T_2$;

establishing a tenth signal representative of the actual flow rate of said overhead vapor product at said time $T_2$;

establishing an eleventh signal representative of the equilibrium flash vaporization end point temperature (EFVEP) at said time $T_2$ in response to said sixth, seventh, eighth, ninth, and tenth signals;

establishing the twelfth signal representative of the actual pressure in said overhead accumulator at said time $T_2$;

establishing a thirteenth signal representative of the actual temperature in said overhead accumulator at said time $T_2$;

establishing a fourteenth signal representative of the equilibrium flash vaporization initial point temperature (EFVIP) at said time $T_2$ for said overhead liquid product in response to said eighth, ninth, tenth, twelfth and thirteenth signals; and subtracting said fourteenth signal from said eleventh signal and dividing the result by 100 to establish said first signal.

10. A method in accordance with claim 7 wherein said step of establishing said second signal comprises multiplying the actual slope of the ASTM boiling point curve at a time $T_1$, which is earlier in time than said time $T_2$, by a factor derived by dividing said first signal by the slope of the equilibrium flash vaporization boiling point line for said overhead liquid product at said time $T_1$.

11. A method in accordance with claim 7 wherein said fifth signal is scaled so as to be representative of the flow rate of said upper external reflux required to maintain the actual ASTM end point temperature for said overhead liquid product substantially equal to the desired ASTM end point temperature and wherein said step of manipulating the flow rate of said upper external reflux in response to said fifth signal comprises:

establishing a sixth signal representative of the actual flow rate of said upper external reflux;

comparing said fifth signal and said sixth signal and establishing a seventh signal which is responsive to the difference between said fifth signal and said sixth signal, wherein said seventh signal is scaled so as to be representative of the position of a control valve, which is operably located so as to control the flow of said upper external reflux, required to maintain the actual flow rate of said upper external reflux substantially equal to the desired flow rate represented by said fifth signal; and manipulating said control valve in response to said seventh signal.

* * * * *